Patented Oct. 16, 1934

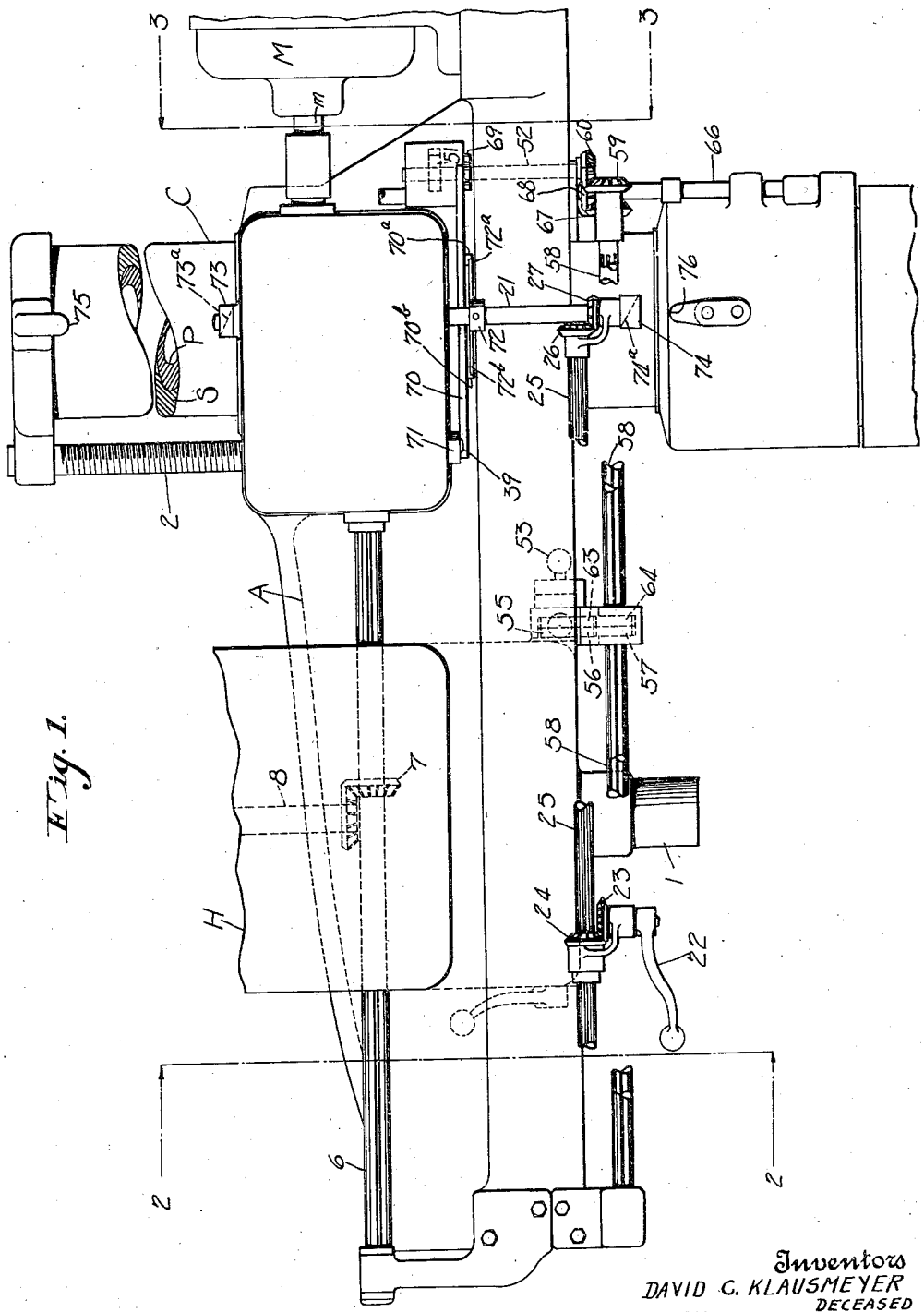

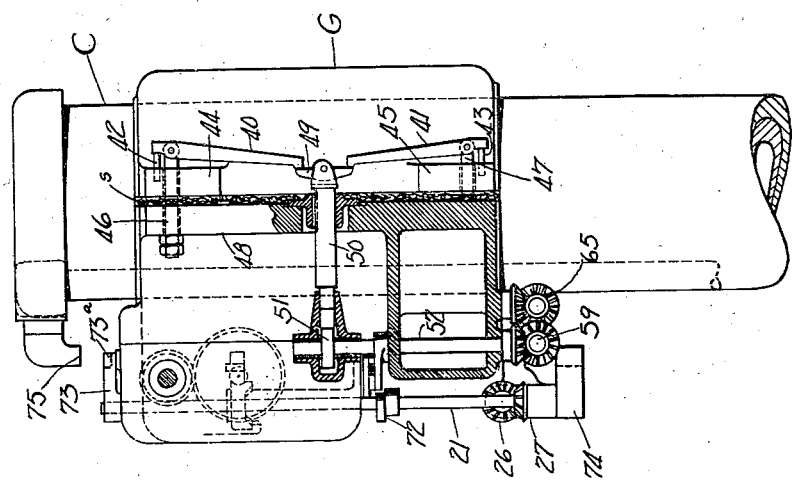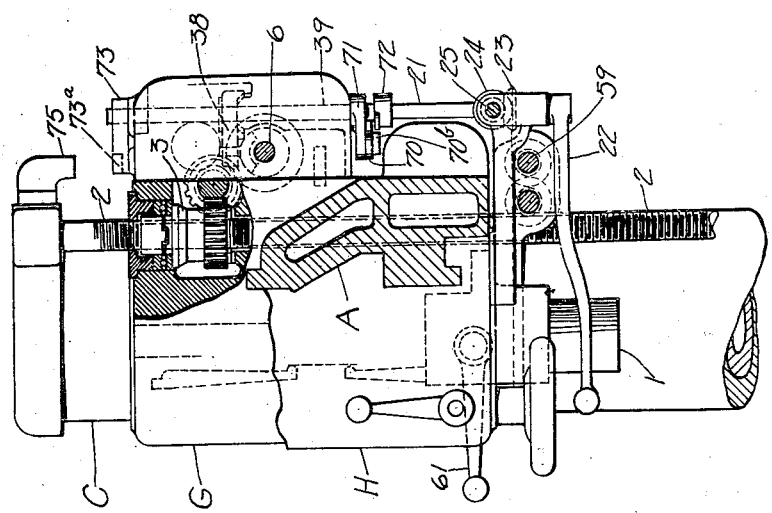

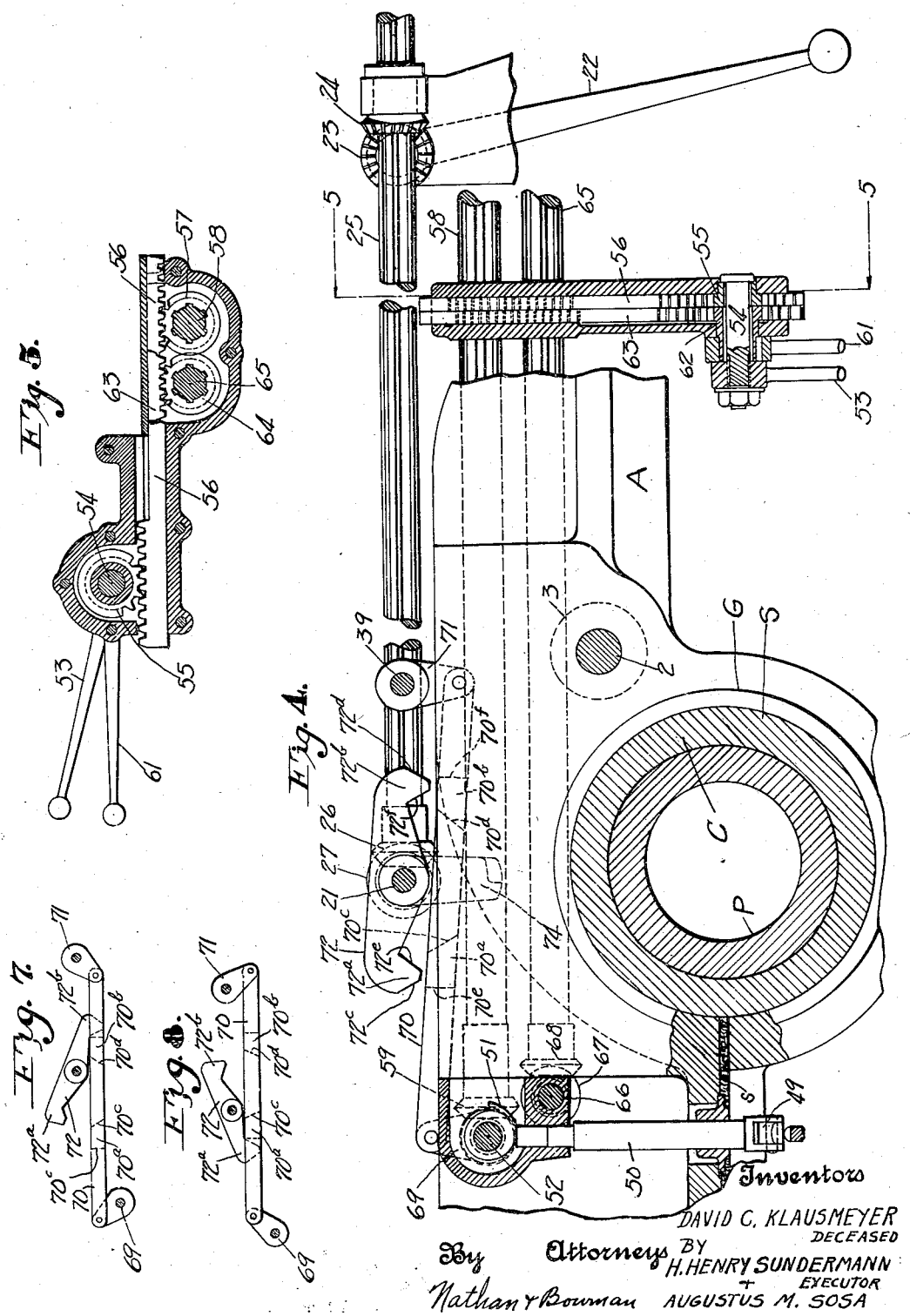

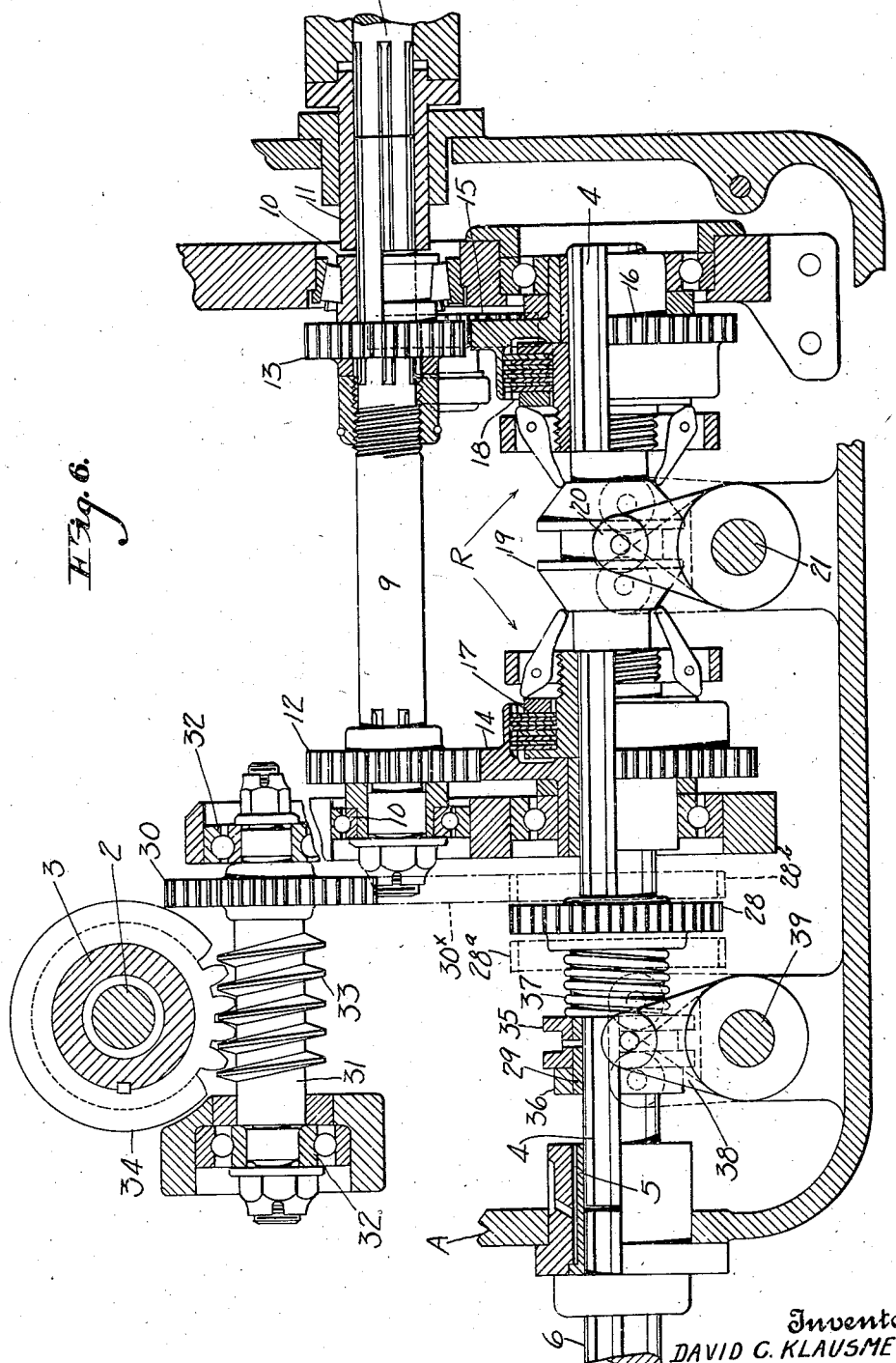

1,976,942

UNITED STATES PATENT OFFICE 1,976,942

INTERLOCKED ARM CLAMPING AND ELEVATING MECHANISM

David C. Klausmeyer, deceased, late of Cincinnati, Ohio, by H. Henry Sundermann, executor, Cincinnati, Ohio; and Augustus M. Sosa, Cincinnati, Ohio, assignors to The Cincinnati Bickford Tool Company, Cincinnati, Ohio, a corporation of Ohio Application April 11, 1930, Serial No. 443,434

10 Claims. (Cl. 77—28)

This invention relates to radial drilling machines and it has as one of its objects to provide improved means for translating the radial arm thereof on its supporting column and for locking the arm to the column, and to combine therewith an improved interlock between the arm clamping and arm translating mechanism so that they both may not be effective simultaneously.

Another object is to provide an improved drive for the arm translating means and so to control said drive from the arm clamping means that certain gears thereof will be de-meshed whenever the arm clamp is closed and completely meshed when the arm clamp is open and before power may be applied thereto to effect translation of the arm, thus causing the gears to be meshed while non-rotating thereby avoiding the clashing of teeth.

Still another object is so to combine, in a radial drill, an arm clamp, an arm translating mechanism and a power transmission for actuating the translating mechanism, that said power transmission will be rendered ineffective upon each actuation of the arm clamp, in which the arm translating mechanism will be disconnected upon closing of said arm clamp and connected upon opening of said clamp and in which the power transmission may be rendered effective to rotate the usual arm shaft when the arm clamp is completely closed or completely opened but not otherwise.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 1 is a rear elevation of a portion of a radial drilling machine embodying the present invention. Fig. 2 is a section substantially on the line 2—2 of Fig. 1. Fig. 3 is a section substantially on the line 3—3 of Fig. 1. Fig. 4 is a horizontal sectional view through the column showing a portion of the arm thereon and illustrating more particularly the arm clamping means and the interlock between the arm clamping means and the power control means. Fig. 5 is a detail sectional view substantially on the line 5—5 of Fig. 4. Fig. 6 is a horizontal sectional view through a portion of the rear end of the arm showing more particularly the forward and reverse drive from the power shaft to the arm shaft, the clutch mechanism controlling said drives and the drive from the arm shaft to the arm-translating nut, said nut and its drive being for the sake of clearness shown somewhat out of its normal position with respect to the arm shaft. Figs. 7 and 8 are detail views of the interlock mechanism above referred to.

Referring more specifically to the drawings, the invention is disclosed as embodied in a radial drill comprising the usual vertical column C consisting of the inner post P and the sleeve S rotatably journaled thereon. Translatably mounted on the column, is the girdle portion G of a radially extending arm A common to machine tools of this type. The girdle portion of the arm is split as shown at s (Figs. 3 and 4) and means, later to be described, are provided for contracting said girdle to clamp the arm in any desired position on said column. Translatably mounted on the radial arm A is the usual drill-head H within which is rotatably and translatably journaled the usual tool spindle 1. Means, comprising a screw 2 supported lengthwise of the column and a nut 3 rotatably journaled in the arm and having a threaded engagement with the screw, are provided for moving the arm vertically on its supporting column. Power to rotate the arm translating nut and to rotate and translate the tool spindle 1 is furnished by a motor M mounted upon a rearward extension of the arm A. This motor is connected through a reversing transmission later to be described with a shaft 4, connected by a coupling 5 with a splined shaft 6 journaled lengthwise of the radial arm. A gear 7, carried by the tool head, is splined to the arm shaft and serves to transmit power to a shaft 8, also carried by the tool head, from which power is taken to rotate and translate the tool spindle. Inasmuch as the specific mechanism for rotating and translating the tool spindle form no part of the present invention detailed illustration and description thereof is deemed unnecessary.

The transmission between the motor M and the shaft 4 comprises a shaft 9 journaled in alignment with the motor shaft in bearings 10 supported by the arm. The shafts m and 9 are secured together against relative rotation by a coupling member 11 fitted to the adjacent splined ends of said shafts. Fixed to the shaft 9 are two gears 12 and 13, of which the former meshes with a gear 14 rotatably journaled co-axial with the shaft 4. The gear 13 meshes with and drives an intermediate gear 15 which in turn drives a gear 16 also rotatably journaled co-axial with the shaft 4. The gears 14 and 16 rotate freely on the shaft 4 and in opposite directions whenever the shaft 9 is rotated.

The gears 14 and 16 selectively may be clutched to the shaft 4, thereby to rotate that shaft either in opposition to, or in the direction of the rotation of the shaft 9. This is effected by means of a reversing clutch mechanism designed generally as R and comprising multiple disk clutches 17 and 18 adapted to be actuated by a shiftable clutch-spool 19 slidingly mounted on an intermediate unsplined portion of the shaft 4. A clutch-shifted 20, fixed upon an oscillatory shaft 21 journaled vertically in the arm, engages the clutch-spool 19 and serves to shift it axially of the shaft 4 to render effective either of the clutches 17 or 18. The shaft 21 may be oscillated by the operator, when standing in his usual working position, by means of a lever 22 carried by the drill-head. This lever is connected to oscillate a bevel gear 23 which meshes with a similar gear 24 splined upon a shaft 25 journaled lengthwise of the drill arm. Upon the rear end of the shaft 25, there is secured a bevel gear 26 which drives a bevel gear 27 fixed upon the shaft 21. Means is provided for transmitting motion from the shaft 4 to the arm translating nut 3. This means comprises a gear 28 which is secured upon a sleeve 29 splined to said shaft and adapted to be shifted into engagement with a gear 30 fixed upon a shaft 31, journaled in bearings 32 supported by the arm. A worm 33 secured upon the shaft 31 meshes with and drives a worm-wheel 34 carried by the nut 3.

In Fig. 6, the screw 2, nut 3, shaft 31, and gear 30 are, for the sake of clearness, shown somewhat out of their actual positions with respect to the shaft 4 and gear 28. In practice the gear 30 is in substantially the position indicated by the dotted lines 30ˣ, so that when the gear 28 is shifted to the right from the position shown in full lines in Fig. 6 to the position indicated by the dotted lines 28ᵇ the teeth of the gears 28 and 30 will be meshed. For shifting the sleeve 29, and gear 28 carried thereby, to move the gear 28 from its fully retracted position 28ᵃ, through its intermediate position, as shown in full lines, to its position 28ᵇ, a spool 35 is slidingly mounted on the sleeve 28. This spool is normally maintained in contact with an annular collar 36 fixed to said sleeve by means of a coil spring 37 surrounding the sleeve 29 intermediate the spool 35 and the gear. The spring 37 affords an impositive means for shifting the sleeve 29 and gear 28 to the right (Fig. 6) to mesh the gears 28 and 30 when the spool is moved in that direction. However, should the teeth of the gears not line up to mesh, the spool may nevertheless have its complete movement by compressing the spring 37 after movement of the gear 28 has been arrested by abutting the side of the gear 30. Immediately the teeth are properly aligned the power stored in the spring 37 will quickly force the gears 28 and 30 completely into mesh, so that no drive is effected therebetween with partially meshed teeth. Upon movement of the spool to the left, it engages the collar 36 and positively disengages the gears 28 and 30. The spool 35 is shifted axially of the shaft 4 in timed relation with the actuation of the arm clamp by means of shifter arm 38 secured upon a shaft 39 journaled in the arm A, which shaft is oscillated from the arm clamp actuating means as later will be described.

As previously stated, the girdle of the arm is split and is adapted to be contracted to clamp it in any desired position on the sleeve. This may be effected, as shown in Fig. 3, by means of clamp levers 40 and 41 fulcrumed upon pins 42 and 43 fixed in lugs 44 and 45 projecting from one portion of the split girdle. The levers are pivoted intermediate their ends to draw-bolts 46 and 47 passing through said lugs and through a flange 48 provided by another portion of the split girdle. Suitable nuts are threaded on the draw-bolts behind the flange 48. The clamp levers extend toward each other and engage opposite ends of a tilting cross head 49 pivotally mounted on a push rod 50, which in turn is slidingly mounted in the arm A. From the foregoing it will be understood that movement of the rod toward the levers 40 and 41 will cause them to contract the girdle about the sleeve in a well known manner.

Axial movement of the rod 50 to close the clamp is effected by a cam 51 fixed upon a shaft 52 journaled vertically in the arm A. This shaft is adapted to be oscillated by a lever 53 carried by the drill-head. The clamp actuating lever 53 is fixed to a short shaft 54 which carries a pinion 55, engaging rack teeth formed on one end of a rack bar 56. Teeth formed on the other end of the rack bar engage a pinion 57 splined upon a shaft 58, journaled lengthwise of the radial arm. A bevel gear 59, secured upon the rear end of the shaft 58 meshes with a similar gear 60 on the shaft 52. Thus it will be seen that manipulation of the lever 53 on the drill head will effect clamping and unclamping of the arm.

The sleeve S is adapted to be clamped to the post P by manipulation of a lever 61 mounted on the drill-head adjacent the lever 53. A pinion 62 fixed to the lever 61 actuates through a rack bar 63 slidingly mounted in the drill-head beside the bar 56, a pinion 64 splined to a shaft 65 journaled lengthwise of the arm A. Clamping of the sleeve to the post is effected by conventional means actuated by a vertical shaft 66 connected with the shaft 65 by bevel gears 67 and 68.

An important feature of this invention resides in the provision of an interlock between the arm clamping means and the arm translating train, whereby the translating train will be rendered ineffective to move the arm whenever the arm clamp is closed and effective to translate the arm when the arm clamp is opened. To that end, the arm clamp shaft 52 has fixed to it an arm 69 connected by a link 70 with a similar arm 71 secured upon the lower end of the shaft 39 which latter carries the shifter for the gear 28. By reason of this connection, when the shaft 52 is rotated clockwise (Fig. 4) to cause the cam 51 to close the arm clamp, the shaft 39 will be rotated counter-clockwise, thereby shifting the gear 28 out of mesh with the gear 30. Conversely, when the shaft 52 is rotated counter-clockwise to release the clamp, the shaft 39 is rotated clockwise and the shifter 38 on the upper end thereof shifts the gear 28 from the position indicated by the dotted lines 28ᵃ to the position 28ᵇ, meshing it with the gear 30 and establishing a drive from the shaft 4 to the arm translating nut 3. After the gears 28 and 30 have been meshed, the arm may be moved vertically on the column selectively in either direction by shifting the clutch-spool 19, thereby to render effective either of the clutches 17 or 18.

Another important feature of this invention consists in the provision of means for shifting the clutch-spool to an intermediate or neutral position, as shown in Fig. 6, whenever the arm clamp is actuated either to clamp the arm to the column or release it therefrom. This, in conjunction with the automatic shifting of the gear 28, insures that the gears 28 and 30 may not be meshed or de-meshed while they are power driven. This prevents the clashing of teeth and breakage thereof due, in prior constructions, to driving while the gears were only partly meshed.

To effect shifting of the spool 19 from the clamp actuating means, a double ended rock arm 72 is secured upon the shaft 21 below the link 70. This rock arm is provided with laterally projecting heads 72$^a$ and 72$^b$ having cam faces 72$^c$, 72$^e$, and 72$^d$, 72$^f$, respectively. Fixed to the underside of the link 70 are interference members or blocks 70$^a$ and 70$^b$ arranged adjacent to and in the horizontal plane of the heads 72$^a$ and 72$^b$, respectively, of the double ended rock arm 72. The interference members 70$^a$ and 70$^b$ are formed with cam faces 70$^c$, 70$^e$ and 70$^d$, 70$^f$ adapted upon endwise movement of the link 70 to engage the cam faces of the rock arm 72, and thereby shift the double ended arm to the intermediate position shown in Fig. 4. This, through the shaft 21 and shifter 20, moves the clutch-spool to neutral position as shown in Fig. 6. After the arm clamp has been completely opened or completely closed, (see Figs. 7 and 8) the shaft 21 may be oscillated in either direction again to render effective either of the clutches 17 or 18. In any position of the lever 70 other than those positions it assumes when the arm clamp is fully opened or fully closed, the interference members 70$^a$ and 70$^b$ lie adjacent the heads 72$^a$ and 72$^b$ of the arm 72, as shown in Fig. 4, and thereby prevent oscillation and actuation of the reversing clutch.

Means also is provided for shifting the reversing clutch to neutral position, thereby stopping translation of the arm when it has reached its extreme upper or extreme lower position. This is effected by arms 73 and 74 fixed upon the upper and lower ends respectively of the shaft 21. The arm 73 is formed with a cam surface 73$^a$, adapted upon extreme upward movement of the arm A, to engage an abutment 75 carried by the column cap. This causes the arm 73, shaft 21, and clutch shifter 20 to be turned counter-clockwise, as viewed in plan, thus shifting the clutch-spool 19 to its intermediate position and disengaging the arm elevating clutch 18. The arm 74 is formed with an oppositely inclined cam surface 74$^a$ which, upon extreme downward movement of the arm A, engages an abutment 76 provided by the sleeve S, thus turning the shaft 21 and clutch shifter 20 clockwise, thereby disconnecting the clutch 17 and stopping downward movement of the arm.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:—

Having thus revealed this invention, we claim as new and desire to secure the following combinations and elements, or equivalents thereof, by Letters Patent of United States:—

1. A radial drill combining a column; an arm translatably mounted thereon; a tool-head on said arm; a tool spindle journaled in said toolhead; a shaft journaled lengthwise of said arm and connected to rotate said spindle in forward and reverse directions; a motor mounted on said arm; a forward and a reverse drive adapted to connect said motor with said shaft; clutch means controlling both of said drives and adapted selectively to render them effective thereby to effect forward and reverse rotation of said arm shaft and said spindle; manual means to actuate said clutch means; means to clamp said arm to said column; and auxiliary means actuated by said arm clamping means in its clamping and unclamping movement to shift said clutch to neutral thereby to render the motor ineffective to rotate said arm shaft.

2. A radial drill combining a column; an arm translatably mounted thereon; a shaft journaled lengthwise of said arm; a power shaft journaled in said arm; forward and reverse drives between said shafts; clutch means for selectively rendering effective either of said drives; means to clamp said arm to said column; means to translate said arm on said column; said arm translating means comprising a screw supported lengthwise of said column; a rotatable nut supported by said arm and engaging said screw; a first gear operatively connected to rotate said nut; a second gear splined on said arm shaft and adapted to be shifted into engagement with the first gear; means for shifting said second gear into mesh with said first gear; said means including a link actuated by said arm clamping means; and means actuated by said link to shift said clutch means thereby to render ineffective both of said drives.

3. A radial drill combining a column; an arm translatably mounted thereon; a shaft journaled lengthwise of said arm; a power shaft journaled in said arm; forward and reverse drives between said shafts; a clutch for selectively rendering effective either of said drives; means to clamp said arm to said column; means to translate said arm on said column; said arm translating means comprising a screw supported lengthwise of said column; a rotatable nut supported by said arm and engaging said screw; a first gear operatively connected to rotate said nut; a second gear splined on said arm shaft and adapted to be shifted into engagement with the first gear; means for shifting said second gear into mesh with said first gear; said means including a link actuated by said arm clamping means; means to actuate said clutch; said means comprising an oscillatory shaft journaled in said arm; a clutch shifter on said shaft; a double ended rock arm secured to said oscillatory shaft; interference elements carried by said link and cooperating with said rock arm to prevent oscillation of said shaft except when said arm clamp is fully closed or fully open.

4. A radial drill combining a column; an arm mounted thereon; a shaft journaled lengthwise of said arm; a drill-head mounted on said arm; a tool spindle journaled in said drill-head; a driving motor mounted on said arm; a power transmission including a reversing clutch adjacent said motor for rotating said arm shaft and spindle in forward and reverse directions from said motor; means to clamp said arm to said column; means to actuate said clamping means; an operative connection between said clamping means and said reversing clutch to shift said clutch to a neutral position by both the opening and closing of said arm clamp; and means independent of said operative connection for controlling said clutch.

5. A radial drill combining a column; an arm translatably mounted thereon; a shaft journaled lengthwise of said arm; a power shaft journaled in said arm; forward and reverse drives between said shafts; a clutch for selectively rendering effective either of said drives; means to clamp said arm to said column; means to translate said arm on said column; said arm translating means comprising a screw supported lengthwise of said column; a rotatable nut supported by said arm and engaging said screw; a first gear operatively connected to rotate said nut; a second gear splined on said arm shaft and adapted to be shifted into engagement with the first gear; means for shifting said second gear into mesh with said first gear; said means including a link actuated by said arm clamping means; means to actuate said clutch; said means comprising an oscillatory shaft; a clutch shifter on said oscillatory shaft; a rock arm secured to said oscillatory shaft; an abutment projecting from said link; said abutment being adapted during opening and closing of said arm clamp to swing said lever and thereby said clutch shifter to an intermediate position to render said clutch ineffective.

6. A radial drill combining a column; an arm translatably mounted thereon; a shaft journaled lengthwise of said arm; a tool-head on said arm; a spindle journaled in said tool-head and driven from said arm shaft; power means including a single reverser for translating said arm up and down on said column and for rotating said arm shaft in opposite directions; mechanism to clamp said arm to said column; means actuated by said clamping mechanism in both its clamping and unclamping movements to shift said reverser to a neutral position; and other means for thereafter again rendering said reverser effective.

7. A radial drill combining a column; an arm translatably mounted thereon; a tool-head on said arm; a spindle journaled in said tool-head; power means including a reversing clutch supported on said arm for translating said arm on said column in opposite directions and for rotating said spindle in forward and reverse directions; mechanism including an actuating lever on said tool head to clamp said arm to said column; means actuated by said clamping mechanism in both its clamping and unclamping movements to shift said clutch to a neutral position; other means including a second lever on said tool-head for actuating said reversing clutch; and means to prevent actuation of said clutch by said second lever except when the clamp means is fully open or fully closed.

8. In a radial drill having an upright column, an arm translatably mounted thereon, and means to clamp said arm to said column; a driving transmission wholly on said arm, arm translating means comprising a stationary screw arranged lengthwise of said column; a nut rotatably but non-translatably journaled in said arm and having a threaded connection with said screw, a reversible driving connection between said transmission and said nut comprising a shaft journaled in said arm and driven from said transmission, a plurality of clutches mounted on said shaft, a gear connection between said shaft and said nut including a non-shiftable gear connected with said nut and a shiftable gear driven from said shaft and adapted to be shifted into and out of mesh with said non-shiftable gear, thereby to render said arm translating means respectively effective and ineffective, means actuated by said arm clamping means in its unclamping movement first to shift said clutches to neutral and then to shift said shiftable gear into mesh with said non-shiftable gear, and other means for thereafter actuating said clutches selectively to effect forward and reverse rotation of said shaft and thereby elevation and depression of said arm.

9. A radial drill combining a column; an arm translatably mounted thereon; means to translate said arm on said column; a tool head on said arm; a tool spindle journaled in said tool head; a shaft journaled lengthwise of said arm and connected to rotate said spindle in forward and reverse directions and also to drive said arm translating means; a motor mounted on said arm; a forward and a reverse drive adapted to connect said motor with said shaft; clutch means controlling both of said drives and adapted selectively to render them effective, thereby to effect forward and reverse rotation of said arm shaft and said spindle, and elevation and depression of said arm; manual means to actuate said clutch means; means to clamp said arm to said column; and auxiliary means actuated by said arm clamping means in its clamping and unclamping movements to actuate said clutch means thereby to render both of said drives ineffective to rotate said arm shaft.

10. A radial drill combining a column; an arm translatably mounted thereon; means including a power transmission having a shiftable gear, a non-shiftable gear and a controlling clutch to translate said arm on said column; means to clamp said arm to said column; means actuated by said arm clamping means in its unclamping movement to render said clutch ineffective and to shift said shiftable gear into mesh with said non-shiftable gear; and other means thereafter to render said clutch effective thereby to effect translation of said arm.

H. HENRY SUNDERMANN,
Executor of the last Will and Testament of David C. Klausmeyer, deceased.
AUGUSTUS M. SOSA.